Patented Oct. 25, 1932

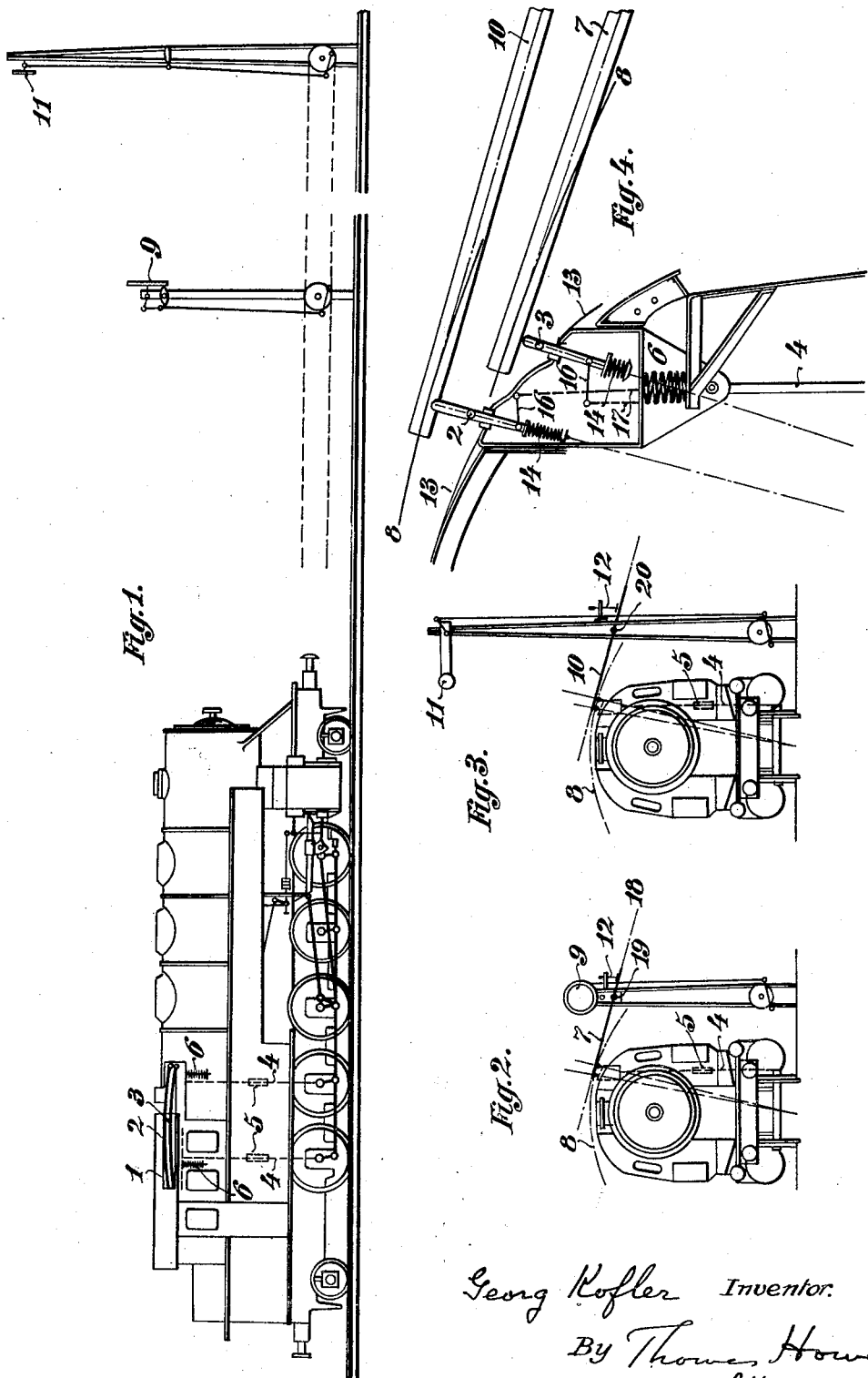

1,885,061

UNITED STATES PATENT OFFICE

GEORG KOFLER, OF BERLIN, GERMANY

AUTOMATIC SAFETY APPLIANCE FOR RAILWAY VEHICLES AGAINST OVERRUNNING OF SIGNALS

Application filed August 28, 1931, Serial No. 559,913, and in Germany August 28, 1930.

My invention relates to automatic safety appliances for railway vehicles against overrunning of signals.

In the old mechanical train controls the vehicle and the track are equipped with contacts, the track contacts being connected to the signals on the line, moved into active position when the allotted signal is at "danger", and projecting into the way of the vehicle contacts. The contact is operated and alarm or braking means on the vehicle are operated.

If the track contacts are between, or at the side of the rails, they may get clogged by ice or dirt, or may be damaged. It has been suggested to place the track contacts at the center of the top of the moving vehicle. However the inevitable irregularities in the motion of the vehicle interfere with the co-operation of the track and vehicle contacts.

By my present invention these disadvantages are eliminated by simple and reliable means.

The said advantages result from the fact that at the upper portion of a vehicle, for instance, at the cab of a locomotive, the contacts are so arranged as to move in approximately circular paths when the vehicle rocks but are independent of the vehicle springs. The track contacts which are secured to the signals and operated in conformity with the position of their indicating means, are arranged with their axes as tangents to the arcs of approximate circles described by the vehicle contacts when the vehicle rocks.

The contacts are built in at the roof or the sides of the cab and are so arranged that they will be depressed only in radial direction to the centre of the rocking motion by the track contacts. If a signal at "danger" is overrun the track contact depresses the vehicle contact radially and automatically operates alarm and braking means on the vehicle. The track contacts at the distinct signals are of different lengths in conformity with their action on the vehicle, so that the contact at the distant signal operates only the vehicle contact for the alarm while the contact at the home signal operates only the vehicle contact for the brake. The two track contacts, however, are so designed that the contact at the home signal also operates the alarm contact so that it is operated if the contact at the distant signal has failed.

By exactly adjusting the vehicle and track contacts with respect to each other proper operation is ensured in all positions of the vehicle. Atmospheric influences will not interfere with the apparatus, nor are they interfered with by the irregular motions of the vehicle.

All parts are readily exchangeable, readily operated and require little maintenance. The contacts are not accessible to the crew when the vehicle is running.

I shall now proceed to describe my invention more in detail in connection with the embodiments thereof, illustrated on the accompanying drawing, it being intended and understood that the invention which is of wide and general application, is illustrated by but not limited to the embodiments so illustrated and described.

In the accompanying drawing forming a part of this specification and showing for purpose of exemplification a preferred form and manner in which the invention may be embodied and practised, but without limiting the claimed invention to such illustrative instances:

Fig. 1 shows a locomotive approaching a distant and home signal,

Fig. 2 is a front-end elevation of a locomotive running past a distant signal at "danger", Fig. 3 shows the same for the home signal, Fig. 4 is a section at right angles to the direction of running showing the track and vehicle contacts.

Referring to Fig. 1 the locomotive system 1 with the arc-shaped cams 2 and 3 is connected to a non-sprung part in the frame of the locomotive, for instance, an axle box, by two rods 4 with turnbuckles 5. Two compression springs 6 at the side of the cab hold the system exactly at the level from the rail for which it has been adjusted.

Referring to Fig. 2, the track contact 7 at the danger signal 9 is shown at the moment of engagement. The dot-and-dash line 8 shows the arc along which the vehicle contacts move when the locomotive rocks. The axis of each arc has been assumed to be positioned at the centre of the track and at the level of the rail heads for compensation to both sides. The dot-and-dash line 18 is the axis of a track contact which is tangent to the arcs. The track contact is movably secured to its signal and is set in accordance with the position of its signalling means. The pivots 19, 20 may be raised and lowered. Checks 12 serve for determining the inclined tangential position of the track contact.

Fig. 3 shows the longer contact 10 of the home signal 11 at "danger" at the moment of engagement. The circular motion of the vehicle contact is indicated by line 8. Line 19 is the axis of track contact 10. 12 is a check for limiting the inclined tangential position of the contact 10. The pivot 20 of the contact 10 may be raised and lowered.

Referring to Fig. 4, the track contact 7 at the distant signal depresses the vehicle contact and by lever 16 and cable 17 operates the alarm means. The track contact at the home signal is still in front of the vehicle contact 2. When it engages with the track contact it is depressed and operates the brakes. At the same time the contact strikes the vehicle contact 3 and for the second time operates the alarm means. The system is adjustably arranged in the roof of the cab. 13 are strips protecting it from the weather. By means of the spring 6 at the wall of the cab, the rods 4 and the turnbuckles 5 which are attached to a lower and unsprung part of the locomotive the system is held at an exactly adjustable position above the rail level. All variations of the weight of the vehicle as well as the vertical movement of its unsprung parts are without influence on the exactly adjusted level of the system 1. 14 are springs holding the vehicle contacts in active position.

What I claim is:

1. The combination with a vehicle movable along a right of way, said vehicle comprising a portion substantially rigidly supported upon said right of way, a second portion of the vehicle and spring means supporting said second portion upon said first mentioned portion, of contact means adapted to engage a track signal arm supported on said right of way, said contacting means being supported by means of springs upon said second portion of the vehicle and means for connecting said contacting means to said first mentioned vehicle portion.

2. The combination with a vehicle movable along a right of way, said vehicle comprising a portion substantially rigidly supported upon said right of way, a second portion of the vehicle and spring means supporting said second portion upon said first mentioned portion, of contact means adapted to engage a track signal arm supported on said right of way, said contacting means being supported by means of springs upon said second portion of the vehicle and means for connecting said contacting means to said first mentioned vehicle portion, the said vehicle contact, at its point of contact with said signal arm, being mounted on said vehicle to move in approximately the arc of a circle as the vehicle rocks from side to side.

3. The combination with a vehicle movable along a right of way, said vehicle comprising a portion substantially rigidly supported upon said right of way, a second portion of the vehicle and spring means supporting said second portion upon said first mentioned portion, of contact means adapted to engage a track signal arm supported on said right of way, said contacting means being supported by means of springs upon said second portion of the vehicle and means for connecting said contacting means to said first mentioned vehicle portion, the said vehicle contact, at its point of contact with said arm, being mounted on said vehicle to move in approximately the arc of a circle as the vehicle rocks from side to side, said signal arm being substantially tangential to the said arc of movement of the vehicle contact.

4. The combination with a vehicle movable along a right of way, said vehicle comprising a portion substantially rigidly supported upon said right of way, a second portion of the vehicle and spring means supporting said second portion upon said first mentioned portion, of contact means adapted to engage a track signal arm supported on said right of way, said contacting means being supported by means of springs upon said second portion of the vehicle and means for connecting said contacting means to said first mentioned vehicle portion, the said contacting means being mounted in the roof of the vehicle.

5. The combination with a vehicle movable along a right of way, said vehicle comprising a portion substantially rigidly supported upon said right of way, a second portion of the vehicle and spring means supporting said second portion upon said first mentioned portion, of contact means adapted to engage a track signal arm supported on said right of way, said contacting means being supported by means of springs upon said second portion of the vehicle and means for connecting said contact means to said first mentioned vehicle portion, said contact means being curved longitudinally of the vehicle whereby the rocking of the vehicle longitudinally is provided for.

6. The combination with a vehicle movable along a right of way, said vehicle comprising a portion substantially rigidly supported upon said right of way, a second portion of the vehicle and spring means supporting said second portion upon the said first mentioned portion, of contacting means, spring means for mounting said contacting means upon said second portion of the vehicle and means for connecting said contacting means to said first mentioned vehicle portion, said contacting means comprising arm engaging parts displaced transversely of the vehicle and of different heights and a plurality of track signal arms on said right of way adapted to engage said arm engaging parts respectively and extending respectively to different distances transversely of said vehicle.

In testimony whereof I affixed my signature.

GEORG KOFLER.